(12) United States Patent
Chase et al.

(10) Patent No.: US 7,257,118 B2
(45) Date of Patent: Aug. 14, 2007

(54) FRAME RELAY SWITCHED DATA SERVICE

(75) Inventors: Christopher J. Chase, Freehold, NJ (US); Stephen L. Holmgren, Little Silver, NJ (US); John Babu Medamana, Colts Neck, NJ (US); Vikram R. Saksena, Freehold, NJ (US)

(73) Assignee: AT&T Corp., New York, NY (US)

( * ) Notice: Subject to any disclaimer, the term of this patent is extended or adjusted under 35 U.S.C. 154(b) by 336 days.

(21) Appl. No.: 10/375,256

(22) Filed: Feb. 28, 2003

(65) Prior Publication Data

US 2003/0161328 A1  Aug. 28, 2003

Related U.S. Application Data

(63) Continuation of application No. 09/551,399, filed on Apr. 17, 2000, which is a continuation of application No. 08/988,159, filed on Dec. 10, 1997, now Pat. No. 6,081,524.

(60) Provisional application No. 60/051,564, filed on Jul. 3, 1997.

(51) Int. Cl.
*H04L 12/56* (2006.01)

(52) U.S. Cl. ............... 370/392; 370/395.5; 370/295.6; 370/465

(58) Field of Classification Search .......... 370/230, 370/230.1, 312, 349, 360, 385, 389, 392, 370/395.7, 395.5, 395.51, 395.52, 397, 401, 370/402, 406, 463, 465, 469, 470, 471, 472, 370/466, 229, 395.4, 395.6
See application file for complete search history.

(56) References Cited

U.S. PATENT DOCUMENTS

| 4,018,993 A | 4/1977 | Edström |
| 4,135,156 A | 1/1979 | Sanders, Jr. et al. |

(Continued)

FOREIGN PATENT DOCUMENTS

CA   2202542   10/1997

(Continued)

OTHER PUBLICATIONS

Fred Halsall, Data Communications, Computer Networks and Open Systems, Fourth Ed. (England: Addison-Wesley Publishers Ltd., 1996), 470-475.*

(Continued)

*Primary Examiner*—Seema S. Rao
*Assistant Examiner*—Shick Hom

(57) ABSTRACT

A new type of data transport service which uses a frame relay layer 2 data link connection identifier (DLCI) to select among various service types, feature sets, and/or closed user groups (CUGs). A layer 3 address may be extracted from a layer 2 frame, and the layer 3 address information may be used to route a data packet over a packet-switched network according to the service classes, feature sets, and/or CUGs selected. At the destination, the layer 3 data packet may again be enclosed in a layer 2 frame with a DLCI indicating the service classes, features sets, and/or CUGs. Because the use of conventional permanent virtual circuits (PVCs) is not required in aspects of the invention, new methods of measuring and managing network traffic are presented.

25 Claims, 11 Drawing Sheets

U.S. PATENT DOCUMENTS

| | | |
|---|---|---|
| 4,181,886 A | 1/1980 | Cooperman |
| 4,285,064 A | 8/1981 | Hodge |
| 4,301,533 A | 11/1981 | Acampora et al. |
| 4,307,461 A | 12/1981 | Brickman et al. |
| 4,319,353 A | 3/1982 | Alvarez, III et al. |
| 4,320,504 A | 3/1982 | Alvarez, III et al. |
| 4,328,543 A | 5/1982 | Brickman et al. |
| 4,330,857 A | 5/1982 | Alvarez, III et al. |
| 4,332,026 A | 5/1982 | Alvarez, III et al. |
| 4,346,470 A | 8/1982 | Alvarez, III et al. |
| 4,377,793 A | 3/1983 | Horna |
| 4,381,562 A | 4/1983 | Acampora |
| 4,468,727 A | 8/1984 | Carrison et al. |
| 4,485,478 A | 11/1984 | Takada |
| 4,507,781 A | 3/1985 | Alvarez, III et al. |
| 4,516,156 A | 5/1985 | Fabris et al. |
| 4,521,879 A | 6/1985 | Gueldenpfennig et al. |
| 4,536,874 A | 8/1985 | Stoffel et al. |
| 4,587,651 A | 5/1986 | Nelson et al. |
| 4,597,077 A | 6/1986 | Nelson et al. |
| 4,599,647 A | 7/1986 | George et al. |
| 4,642,806 A | 2/1987 | Hewitt et al. |
| 4,644,534 A | 2/1987 | Sperlich |
| 4,665,516 A | 5/1987 | Middleton et al. |
| 4,672,602 A | 6/1987 | Hargrave et al. |
| 4,679,191 A | 7/1987 | Nelson et al. |
| 4,686,698 A | 8/1987 | Tompkins et al. |
| 4,701,907 A | 10/1987 | Collins |
| 4,703,479 A | 10/1987 | Ikeda |
| 4,706,080 A | 11/1987 | Sincoskie |
| 4,706,081 A | 11/1987 | Hart et al. |
| 4,710,917 A | 12/1987 | Tompkins et al. |
| 4,713,806 A | 12/1987 | Oberlander et al. |
| 4,720,850 A | 1/1988 | Oberlander et al. |
| 4,720,873 A | 1/1988 | Goodman et al. |
| 4,730,305 A | 3/1988 | Acampora et al. |
| 4,739,510 A | 4/1988 | Jeffers et al. |
| 4,751,732 A | 6/1988 | Kamitake |
| 4,769,833 A | 9/1988 | Farleigh et al. |
| 4,775,974 A | 10/1988 | Kobayashi |
| 4,777,657 A | 10/1988 | Gillaspie |
| 4,792,948 A | 12/1988 | Hangen et al. |
| 4,797,589 A | 1/1989 | Collins |
| 4,797,878 A | 1/1989 | Armstrong |
| 4,811,338 A | 3/1989 | Haruyama et al. |
| 4,813,039 A | 3/1989 | Yoshihiro |
| 4,847,829 A | 7/1989 | Tompkins et al. |
| 4,847,892 A | 7/1989 | Shelley |
| 4,858,225 A | 8/1989 | deSantis |
| 4,868,811 A | 9/1989 | Suzuki |
| 4,876,737 A | 10/1989 | Woodworth et al. |
| 4,879,711 A | 11/1989 | Rosen |
| 4,888,769 A | 12/1989 | Deal |
| 4,890,280 A | 12/1989 | Hirata |
| 4,894,822 A | 1/1990 | Buhrke et al. |
| 4,916,691 A | 4/1990 | Goodman |
| 4,933,936 A | 6/1990 | Rasmussen et al. |
| 4,937,825 A | 6/1990 | Ballard et al. |
| RE33,426 E | 11/1990 | Sugimoto et al. |
| 4,970,721 A | 11/1990 | Aczel et al. |
| 4,993,015 A | 2/1991 | Fite, Jr. |
| 4,999,829 A | 3/1991 | Fite, Jr. et al. |
| 5,014,267 A | 5/1991 | Tompkins et al. |
| 5,016,243 A | 5/1991 | Fite, Jr. |
| 5,018,133 A | 5/1991 | Tsukakoshi et al. |
| 5,019,910 A | 5/1991 | Filmer |
| 5,023,869 A | 6/1991 | Grover et al. |
| 5,023,873 A | 6/1991 | Stevenson et al. |
| 5,027,400 A | 6/1991 | Baji et al. |
| 5,029,163 A | 7/1991 | Chao et al. |
| 5,058,138 A | 10/1991 | Figura et al. |
| 5,065,397 A | 11/1991 | Shiobara |
| 5,079,764 A | 1/1992 | Orita et al. |
| 5,081,621 A | 1/1992 | Sugimoto |
| 5,086,426 A | 2/1992 | Tsukakoshi et al. |
| 5,090,011 A | 2/1992 | Fukuta et al. |
| 5,095,480 A | 3/1992 | Fenner |
| 5,101,267 A | 3/1992 | Morales-Garza |
| 5,115,433 A | 5/1992 | Baran et al. |
| 5,121,396 A | 6/1992 | Irvin et al. |
| 5,130,978 A | 7/1992 | Mobasser |
| 5,153,876 A | 10/1992 | Sin |
| 5,177,604 A | 1/1993 | Martinez |
| 5,184,347 A | 2/1993 | Farwell et al. |
| 5,191,582 A | 3/1993 | Upp |
| 5,195,090 A | 3/1993 | Bolliger et al. |
| 5,195,091 A | 3/1993 | Farwell et al. |
| 5,208,811 A | 5/1993 | Kashio et al. |
| 5,223,923 A | 6/1993 | Morales-Garza |
| 5,224,099 A | 6/1993 | Corbalis et al. |
| 5,229,990 A | 7/1993 | Teraslinna |
| 5,229,994 A | 7/1993 | Balzano et al. |
| 5,237,564 A | 8/1993 | Lespagnol et al. |
| 5,239,545 A | 8/1993 | Buchholz |
| 5,251,207 A | 10/1993 | Abensour et al. |
| 5,260,936 A | 11/1993 | Bardet et al. |
| 5,274,643 A | 12/1993 | Fisk |
| 5,276,907 A | 1/1994 | Meidan |
| 5,278,892 A | 1/1994 | Bolliger et al. |
| 5,280,481 A | 1/1994 | Chang et al. |
| 5,287,535 A | 2/1994 | Sakagawa et al. |
| 5,291,479 A | 3/1994 | Vaziri et al. |
| 5,291,492 A | 3/1994 | Andrews et al. |
| 5,295,133 A | 3/1994 | Jurkevich |
| 5,295,137 A | 3/1994 | Jurkevich |
| 5,301,273 A | 4/1994 | Konishi |
| 5,303,042 A | 4/1994 | Lewis et al. |
| 5,303,237 A | 4/1994 | Bergman et al. |
| 5,305,308 A | 4/1994 | English et al. |
| 5,307,348 A | 4/1994 | Buchholz et al. |
| 5,309,440 A | 5/1994 | Nakamura et al. |
| 5,313,454 A | 5/1994 | Bustini et al. |
| 5,313,457 A | 5/1994 | Hostetter et al. |
| 5,315,591 A | 5/1994 | Brent et al. |
| 5,319,705 A | 6/1994 | Halter et al. |
| 5,319,707 A | 6/1994 | Wasilewski et al. |
| 5,325,421 A | 6/1994 | Hou et al. |
| 5,327,421 A | 7/1994 | Hiller et al. |
| 5,331,631 A | 7/1994 | Teraslinna |
| 5,335,276 A | 8/1994 | Thompson et al. |
| 5,337,044 A | 8/1994 | Folger et al. |
| 5,343,465 A | 8/1994 | Khalil |
| 5,345,445 A | 9/1994 | Hiller et al. |
| 5,345,446 A | 9/1994 | Hiller et al. |
| 5,351,146 A | 9/1994 | Chan et al. |
| 5,355,362 A | 10/1994 | Gorshe et al. |
| 5,361,259 A | 11/1994 | Hunt et al. |
| 5,363,369 A | 11/1994 | Hemmady et al. |
| 5,365,265 A | 11/1994 | Shibata et al. |
| 5,365,524 A | 11/1994 | Hiller et al. |
| 5,373,550 A | 12/1994 | Campbell et al. |
| 5,381,408 A | 1/1995 | Brent et al. |
| 5,387,941 A | 2/1995 | Montgomery et al. |
| 5,390,169 A | 2/1995 | Bernstein |
| 5,390,175 A | 2/1995 | Hiller et al. |
| 5,392,277 A | 2/1995 | Bernstein |
| 5,392,402 A | 2/1995 | Robrock, II |
| 5,394,561 A | 2/1995 | Freeburg |
| 5,400,329 A | 3/1995 | Tokura et al. |
| 5,400,401 A | 3/1995 | Wasilewski et al. |
| 5,402,418 A | 3/1995 | Shibata et al. |
| 5,402,478 A | 3/1995 | Hluchyj et al. |
| 5,404,505 A | 4/1995 | Levinson |
| 5,408,237 A | 4/1995 | Patterson et al. |

| Patent | | Date | Inventor | Class |
|---|---|---|---|---|
| 5,408,419 | A * | 4/1995 | Wong | 709/225 |
| 5,408,464 | A | 4/1995 | Jurkevich | |
| 5,412,647 | A | 5/1995 | Giroux et al. | |
| 5,412,660 | A | 5/1995 | Chen et al. | |
| 5,416,770 | A | 5/1995 | Stoner et al. | |
| 5,420,857 | A | 5/1995 | Jurkevich | |
| 5,420,866 | A | 5/1995 | Wasilewski | |
| 5,422,882 | A | 6/1995 | Hiller et al. | |
| 5,423,002 | A | 6/1995 | Hart | |
| 5,425,029 | A | 6/1995 | Hluchyj et al. | |
| 5,426,635 | A | 6/1995 | Mitra et al. | |
| 5,426,636 | A | 6/1995 | Hiller et al. | |
| 5,426,640 | A | 6/1995 | Hluchyj et al. | |
| 5,426,773 | A | 6/1995 | Chabanet et al. | |
| 5,428,607 | A | 6/1995 | Hiller et al. | |
| 5,428,608 | A | 6/1995 | Freeman et al. | |
| 5,428,616 | A | 6/1995 | Field et al. | |
| 5,428,629 | A | 6/1995 | Gutman et al. | |
| 5,430,727 | A * | 7/1995 | Callon | 370/401 |
| 5,434,850 | A | 7/1995 | Fielding et al. | |
| 5,434,856 | A | 7/1995 | Huang | |
| 5,436,891 | A | 7/1995 | Grossman et al. | |
| 5,438,565 | A | 8/1995 | Hemmady et al. | |
| 5,442,691 | A | 8/1995 | Price et al. | |
| 5,446,726 | A | 8/1995 | Rostoker et al. | |
| 5,446,730 | A | 8/1995 | Lee et al. | |
| 5,448,564 | A | 9/1995 | Thor | |
| 5,450,394 | A | 9/1995 | Gruber et al. | |
| 5,450,395 | A | 9/1995 | Hostetter et al. | |
| 5,452,293 | A | 9/1995 | Wilkinson et al. | |
| 5,453,979 | A | 9/1995 | Schibler et al. | |
| 5,457,808 | A | 10/1995 | Osawa et al. | |
| 5,457,811 | A | 10/1995 | Lemson | |
| 5,459,723 | A | 10/1995 | Thor | |
| 5,463,777 | A | 10/1995 | Bialkowski et al. | |
| 5,469,468 | A | 11/1995 | Schilling | |
| 5,469,495 | A | 11/1995 | Beveridge | |
| 5,471,473 | A | 11/1995 | Tejima | |
| 5,473,612 | A | 12/1995 | Dehner, Jr. et al. | |
| 5,481,561 | A | 1/1996 | Fang | |
| 5,481,609 | A | 1/1996 | Cohen et al. | |
| 5,490,140 | A * | 2/1996 | Abensour et al. | 370/352 |
| 5,490,252 | A | 2/1996 | Macera et al. | |
| 5,491,695 | A | 2/1996 | Meagher et al. | |
| 5,495,607 | A | 2/1996 | Pisello et al. | |
| 5,497,375 | A | 3/1996 | Hluchyj | |
| 5,506,904 | A | 4/1996 | Sheldrick et al. | |
| 5,517,502 | A | 5/1996 | Bestler et al. | |
| 5,519,699 | A | 5/1996 | Ohsawa | |
| 5,521,914 | A * | 5/1996 | Mavraganis et al. | 370/352 |
| 5,526,404 | A | 6/1996 | Wiedeman et al. | |
| 5,526,489 | A | 6/1996 | Nilakantan et al. | |
| 5,539,884 | A | 7/1996 | Robrock, II | |
| 5,541,922 | A * | 7/1996 | Pyhalammi | 370/462 |
| 5,565,910 | A | 10/1996 | Rowse et al. | |
| 5,566,173 | A | 10/1996 | Steinbrecher | |
| 5,579,370 | A | 11/1996 | Fukushima et al. | |
| 5,587,743 | A | 12/1996 | Montgomery et al. | |
| 5,594,782 | A | 1/1997 | Zicker et al. | |
| 5,628,011 | A | 5/1997 | Ahamed et al. | |
| 5,654,957 | A * | 8/1997 | Koyama | 370/355 |
| 5,675,576 | A | 10/1997 | Kalampoukas et al. | 370/232 |
| 5,689,553 | A | 11/1997 | Ahuja et al. | |
| 5,727,065 | A | 3/1998 | Dillon | |
| 5,754,530 | A | 5/1998 | Awdeh et al. | |
| 5,796,727 | A | 8/1998 | Harrison et al. | |
| 5,802,365 | A * | 9/1998 | Kathail et al. | 719/321 |
| 5,812,527 | A * | 9/1998 | Kline et al. | 370/232 |
| 5,815,495 | A * | 9/1998 | Saitoh et al. | 370/249 |
| 5,828,666 | A * | 10/1998 | Focsaneanu et al. | 370/389 |
| 5,852,721 | A | 12/1998 | Dillon et al. | |
| 5,883,893 | A | 3/1999 | Rumer | |
| 5,903,559 | A * | 5/1999 | Acharya et al. | 370/355 |
| 5,907,677 | A * | 5/1999 | Glenn et al. | 709/206 |
| 5,909,443 | A | 6/1999 | Fichou et al. | |
| 5,914,956 | A | 6/1999 | Williams | |
| 5,920,560 | A * | 7/1999 | Takahashi et al. | 370/395.7 |
| 5,946,313 | A | 8/1999 | Allan et al. | |
| 5,970,048 | A * | 10/1999 | Pajuvirta et al. | 370/230 |
| 5,974,052 | A | 10/1999 | Johnson et al. | |
| 5,982,869 | A | 11/1999 | Lozano | |
| 5,991,268 | A | 11/1999 | Awdeh et al. | |
| 6,009,097 | A * | 12/1999 | Han | 370/395.52 |
| 6,011,778 | A | 1/2000 | Kilkki et al. | 370/232 |
| 6,012,090 | A | 1/2000 | Chung | |
| 6,018,530 | A * | 1/2000 | Chakravorty | 370/471 |
| 6,023,453 | A | 2/2000 | Ruutu et al. | |
| 6,023,470 | A | 2/2000 | Lee et al. | 370/401 |
| 6,081,524 | A * | 6/2000 | Chase et al. | 370/389 |
| 6,108,336 | A | 8/2000 | Duault | |
| 6,115,748 | A * | 9/2000 | Hauser et al. | 709/234 |
| 6,118,759 | A * | 9/2000 | Ohyoshi et al. | 370/229 |
| 6,151,324 | A | 11/2000 | Belser et al. | |
| 6,185,215 | B1 | 2/2001 | Aho | |
| 6,212,163 | B1 | 4/2001 | Aida | |
| 6,230,203 | B1 | 5/2001 | Koperda et al. | |
| 6,298,120 | B1 | 10/2001 | Civanlar et al. | |
| 6,400,681 | B1 | 6/2002 | Bertin et al. | |
| 6,487,217 | B1 * | 11/2002 | Baroudi | 370/466 |
| 6,870,827 | B1 | 3/2005 | Voit et al. | |

FOREIGN PATENT DOCUMENTS

| | | |
|---|---|---|
| EP | 0 719 012 A2 | 6/1996 |
| EP | 0 800 294 A1 | 10/1997 |
| WO | WO 9619060 A | 6/1996 |

OTHER PUBLICATIONS

Bonomi, F. et al., "The Rate-Based Flow Control Framework for the Available Bit Rate ATM Service", IEEE Network, Mar./Apr. 1995, pp. 25-39, vol. 9, No. 2, ISSN: 0890-8044, IEEE Inc. New York, US.

Sharon, C. M. et al., "Modeling and Control of VBR H.261 Video Transmission over Frame Relay Networks", IEEE Transactions on Circuits and Systems for Video Technology, Jun. 1997, pp. 527-538, vol. 7, No. 3, ISSN: 1051-8215, IEEE Inc. New York, US.

Beraldi, R. et al., "Selective BECN Schemes for Congestion Control of ABR Traffic in ATM LAN", 1996 IEEE International Conference on Communications (ICC). Converging Technologies for Tomorrow's Applications. Dallas, Jun. 23-27, 1996, pp. 503-507, vol. 1, ISSN: 0-7803-3250-4, IEEE Inc. New York, US.

Fred Halsall, Data Communications, Computer Networks and Open Systems, Fourth Ed. (Englad: Addison-Wesley Publishers Ltd., 1996) pp. 470-475.

EPO Search report, mail date Jul. 29, 2003, pp. 1-6.

* cited by examiner

*FIG. 3*

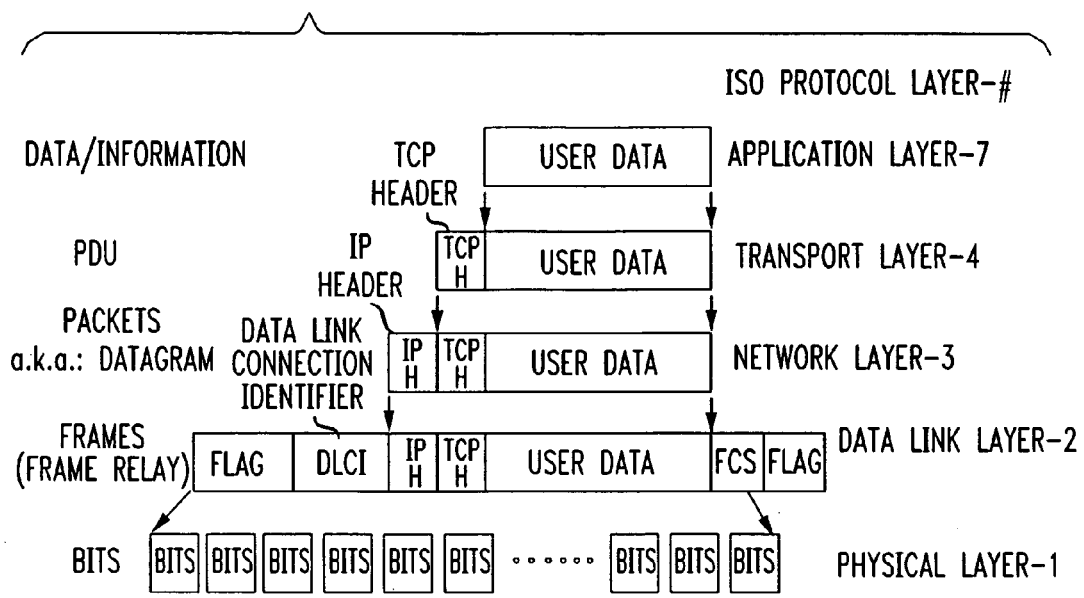

*FIG. 4*

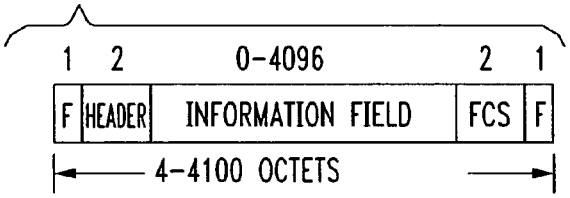

F = FRAME DELIMITER (FLAG)
(01111110 BINARY VALUE)
HEADER = FR HEADER FIELD
INFORMATION FIELD = USER'S PAYLOAD
FCS = FRAME CHECK SEQUENCE

*FIG. 5*

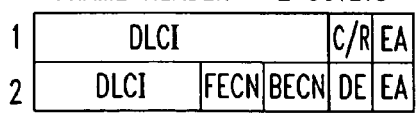

DLCI = DATA LINK CONNECTION IDENTIFIER (10 BITS)
C/R = COMMAND / RESPONSE (1 BIT)
EA = EXTENDED ADDRESS (2 BITS)
FECN = FORWARD EXPLICIT CONGESTION NOTIFICATION (1 BIT)
BECN = BACKWARD EXPLICIT CONGESTION NOTIFICATION (1 BIT)
DE = DISCARD ELIGIBILITY (1 BIT)

Customer A45

| IP Address | Output Port |
|---|---|
| 10.13.0.0 | S0 (serial port 0) |
| 128.13.54.0 | S1 |
| 128.80.65.0 | S2 |
| 128.13.54.128 | E0 (Ethernet) |

Customer B230

| IP Address | Output Port |
|---|---|
| 10.13.0.0 | S4 |
| 122.56.0.0 | S2 |
| 122.60.202.0 | S3 |
| 122.60.202.24 | S3 |

FIG. 15

| Customer ID | IP Address | Output Port |
|---|---|---|
| A45 | 10.13.0.0 | S0 (serial port 0) |
| A45 | 128.13.54.0 | S1 |
| A45 | 128.80.65.0 | S2 |
| A45 | 128.13.54.128 | E0 (Ethernet) |
| B230 | 10.13.0.0 | S4 |
| B230 | 122.56.0.0 | S2 |
| B230 | 122.60.202.0 | S3 |
| B230 | 122.60.202.24 | S3 |

FIG. 16

FRAME RELAY SWITCHED DATA SERVICE

The present application claims priority from application Ser. No. 09/551,399 filed Apr. 17, 2000, which is a continuation of application Ser. No. 08/988,159, now U.S. Patent No. 6,081,524, filed Dec. 10, 1997, and claims priority back to provisional application Ser. No. 60/051,564 entitled "FRAME RELAY SWITCHED DATA SERVICE" filed Jul. 3, 1997, herein incorporated by reference.

BACKGROUND OF THE INVENTION

1. Technical Field

The present invention is directed to systems and methods for implementing improved network architectures, and more specifically to systems and methods for routing internet protocol (IP) packets using modified frame relay protocols.

2. Description of the Related Arts

Recently, the popularity of large "meshed" networks has been increasing. However, large-scale highly-meshed networks can be difficult to implement, maintain, and manage using conventional network technologies.

An example of a conventional mesh configuration is shown in FIG. 1. A wide-area network (WAN) 900 includes a plurality of routers $R_A$, $R_B$, $R_C$, $R_D$, (customer premises equipment (CPE)) respectively disposed at a plurality of end user locations A, B, C, and D and interconnected to a service provider's network (SPN) 901 via respective user-network interfaces (UNI) 920-1, -2, . . . , -n. The user-network interfaces 920 may be variously configured to be, for example, an asynchronous transfer mode (ATM) switch having a frame relay interface to CPE. Connecting the sites together are logical paths called, for example, permanent virtual circuits (PVCs) $P_{A-C}$, $P_{A-D}$, $P_{B-D}$, $P_{A-B}$, $P_{C-B}$, that are characterized by their endpoints at the UNIs 920-1, 920-2, . . . , 920-n and a guaranteed bandwidth called the committed information rate (CIR).

FIG. 2 provides a detailed view of the flow of data across the WAN 900. There exists a plurality of layers of protocol over which communications may occur. For example, the well-known layers of the International Standards Organization's (ISO) Open Systems Interconnect Model having layers from a physical layer (layer 1), a datalink layer (layer 2), a network layer (layer 3), up through and including an application layer (layer 7). Under this model, user data 902 is generated by a user application running at the application layer 903. At the transport layer (layer 4) 904, a source and destination port address 906 (as part of the TCP header (layer 4)) may be added to the user data 902. At the network layer (layer 3) 905, an additional header (i.e., an IP header (layer 3) containing source and destination IP addresses) 908 may be added. Thus, the layer 3 user data field includes the layer 4 user data 902 plus the layer 4 header 906. The layer 3 protocol data unit (PDU) 902, 906, 908, which makes up, for example, an IP packet 950, is then passed down to layer 2 909 in the CPE (routers $R_A$, $R_B$, $R_C$, $R_D$) that interfaces to the SPN 901. In the router, a table maps one or more IP addresses (layer 3) 908 to an appropriate PVC or PVCs ($P_{A-C}$, $P_{A-D}$, $P_{B-D}$, $P_{A-B}$, $P_{C-B}$). The router table is maintained by the customer. Once the correct PVC is located in the routing table, the corresponding data link connection identifier (DLCI) (layer 2) 912 is coded into the header of the frame relay frame 914 (packet). Thereafter, the remainder of the frame relay frame is included and a frame check sum (FCS) is computed. The frame is then passed down to the physical layer and transmitted to the SPN 901.

At the UNI 920, the frame is checked for validity to determine if there is a predefined PVC associated with the DLCI 912. If so, the frame 914 is then forwarded on that PVC through the network along the same path and in the same order as other frames with that DLCI, as depicted in FIG. 2. The layer 2 frame information remains as the packet traverses the frame relay network whether this network is actually implemented as a frame relay network or other network such as an ATM network. The frame is carried to its destination without any further routing decisions being made in the network. The FCS is checked at the egress UNI and if the frame is not corrupted, it is then output to the UNI associated with the end user.

As is well known in the art, FIGS. 1-3 provide exemplary diagrams of how the frame relay data packets are assembled at the various ISO layers using the example of TCP/IP protocol transport over a frame relay data link layer. The example shows how the user data at the application layer is "wrapped" in succeeding envelopes, making up the PDUs, as it passes down the protocol stack. Specifically, the composition of the Header field is expanded for detail and is shown in FIG. 5. The data link connection identifier (DLCI) field comprises 10 bits spread over the first and second octet, and allows for 1023 possible addresses, of which some are reserved for specific uses by the standards. As shown in FIG. 3, the DLCI is added to the frame relay header according to what destination IP address is specified in the IP packet. This decision about what DLCI is chosen is made by the CPE, usually a router, based on configuration information provided by the customer that provides a mapping of IP addresses into the PVCs that connect the current location with others across the WAN 900.

In conventional frame relay, a layer 2 Q.922 frame carries the layer 3 customer data packet across the network in a permanent virtual circuit (PVC) which is identified by a data link connection identifier (DLCI). Thus, the DLCIs are used by the customer as addresses that select the proper PVC to carry the data to the desired destination. The customer data packet is carried across the network transparently and its contents are never examined by the network.

The conventional meshed frame relay network discussed above has a number of limitations. For example, every time a new end user location is added to the meshed network, a new connection is required to be added to every other end user location. Consequently, all of the routing tables must be updated at every end user location. Thus, a "ripple" effect propagates across the entire network whenever there is a change in the network topology. For large networks with thousands of end user locations, this ripple effect creates a large burden on both the network provider to supply enough permanent virtual circuits (PVCs) and on the network customers in updating all of their routing tables. Further, most routers are limited to peering with a maximum of 10 other routers which makes this network topology difficult to implement. As networks grow in size, the number of PVCs customers need to manage and map to DLCIs increases. Further complicating the problem is a trend toward increasing "meshedness" of networks, meaning more sites are directly connected to each other. The result is a growth in the number and mesh of PVCs in networks that does not scale well with current network technologies.

A possible solution for handling large meshed networks is to use a virtual private network (VPN) which interconnects end user locations using encrypted traffic sent via "tunneling" over the internet. However, VPNs are not widely supported by internet service providers (ISPs), have erratic information rates, and present a number of security concerns.

Another possible solution is the use of frame relay based switched virtual circuits (SVCs). While PVCs (discussed above) are usually defined on a subscription basis and are analogous to leased lines, SVCs are temporary, defined on an as-needed basis, and are analogous to telephone calls. However, SVCs require continuous communications between all routers in the system to coordinate the SVCs. Further, because the tables mapping IP addresses to SVC addresses are typically manually maintained, SVCs are often impractical for large highly-meshed networks. Security is a major concern for SVC networks where tables are mismanaged or the network is spoofed. Further, frame SVCs are difficult to interwork with asynchronous transfer mode (ATM) SVCs.

None of the above solutions adequately address the growing demand for large mesh networks. Accordingly, there is a need for network architectures which enable implementation of large mesh networks having security, low maintenance costs, efficient operations, and scalability.

SUMMARY OF THE INVENTION

Aspects of the present invention solve one or more of the above-stated problems and/or provide improved systems and methods for implementing a network architecture.

A new type of data transport service takes advantage of the existing base of frame relay customer premises equipment (CPE) and customers while offering a new mechanism for providing extensible service features to those customers. In the new service, data link connection identifiers (DLCIs) may be used by the CPE to select among service types, feature sets, and closed user groups (CUGs). The DLCI is used in the layer 2 frame that conveys the user data to the network. The layer 3 user data packet is extracted from the layer 2 frame and the layer 3 address information for the (routable) protocol is used to route the user data packet over a high-performance packet switched network, according to the service class/feature set selected by the DLCI. At the destination, the layer 3 data packet is again enclosed in a layer 2 frame with a DLCI that indicates to which service group it belongs. The frame is then forwarded to the CPE. Use of this technique will allow the existing frame relay CPE to support, over the same physical interface, conventional frame relay service with a range of DLCIs that are linked to logical paths such as permanent virtual circuit (PVCs), as well as a range of DLCIs that are linked to service and/or feature sets. This will allow a robust method for extension of new services to the frame relay installed base, with minimal impact to existing customer equipment.

In some aspects of the invention, frame relay DLCIs are used for selecting among various "service categories." This differs significantly from conventional frame relay, which uses DLCIs only to select PVCs and/or switched virtual circuits (SVCs). Service categories may include, but are not limited to, communication via the public internet, communication via a local intranet, communication within a closed user group (CUG), communication with an extranet (e.g., a network of trusted suppliers or corporate trading partners), live audio/video transmission, multicasting, telephony over internet protocol (IP), or any combination thereof. Thus, the concept of a frame relay PVC is significantly expanded by aspects of the present invention. For example, the location of an intended network endpoint recipient is not necessarily determined by a DLCI at a sending network endpoint. The DLCI may represent a service category with the intended recipient indicated by an IP address within the frame relay packet. This results in a significant benefit to network customers because, unlike that of conventional frame relay, customers no longer need to update their local DLCI tables each time a network customer with whom they wish to communicate is added or removed from the network. Thus, the customer's burden of network administration is substantially reduced.

In sub-aspects of the invention, some DLCIs may be used to select among service categories ("service category DLCIs") while in the same network other DLCIs may be used to select conventional PVCs and/or SVCs ("conventional DLCIs"). In other words, conventional frame relay may be mixed with aspects of the present invention within the same network, allowing aspects of the present invention to be incrementally implemented in existing conventional frame relay networks.

In further aspects of the invention, addressing contained in multiple layers (e.g., as defined by the Open System Interconnection model) are compared with each other in a network to determine routing errors. If the addressing in the layers are consistent with each other, then the associated data is routed without interruption. On the other hand, if the addressing in the layers is inconsistent with each other, the associated data may be specially handled. For example, the data may be discarded, sent to a pre-determined address, and/or returned to the sender. This address comparison may be applied to the sending address and/or the destination address. An advantage of this multiple layer address comparison is that network security is increased. For instance, problems such as "spoofing," which is the practice of purposely providing an incorrect sending internet protocol (IP) address, are better controlled by such a method.

In still further aspects of the invention, routing look-up tables within the network are separated such that, for example, each customer, closed user group (CUG), extranet, and/or intranet may have its own private partition and/or separate table. This can provide greater network speed because a router need not scan the entire available address space for all network customers at once. Furthermore, data security is improved because the risk of sending data to a wrong recipient is reduced.

In yet further aspects of the invention, layer 3 and/or layer 4 IP address information is utilized to route the fast packets through the network.

In even further aspects of the invention, new network traffic management techniques and measurements are defined. For example, in some traffic-management aspects of the invention, committed delivery rates (CDRs) may be assigned to one or more UNIs. A CDR is the average minimum data rate that is guaranteed to be delivered to a given UNI when sufficient traffic is being sent to the UNI. In further traffic-management aspects of the invention, a destination rate share (DRS) is assigned to one or more UNIs. The DRS may be used to determine the share of traffic that a given UNI may send through the network. If several UNIs are simultaneously offering to send traffic to the same destination UNI, then each sending UNI's share of the network may be determined by its own DRS and the DRSs of the other sending UNIs.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in network theory and design, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings. For the purpose of illustration, embodiments showing one or more aspects of the invention are shown in the drawings. These exemplary embodiments, however, are not intended to limit the invention solely thereto.

FIGS. 3-5 show the construction and flow of data packets through the network.

DETAILED DESCRIPTION OF PREFERRED EMBODIMENTS

Exemplary embodiments of the present invention allow the large installed base of frame relay customer premises equipment (CPE) to be maintained by using the same interface in a different way to deliver new sets of services and features to the customer. For example, the data link connection identifier (DLCI) known from the frame relay protocol may be used to select among several virtual private networks with differing address spaces, feature sets, and/or conventional permanent virtual circuits (PVCs).

Figure 1:
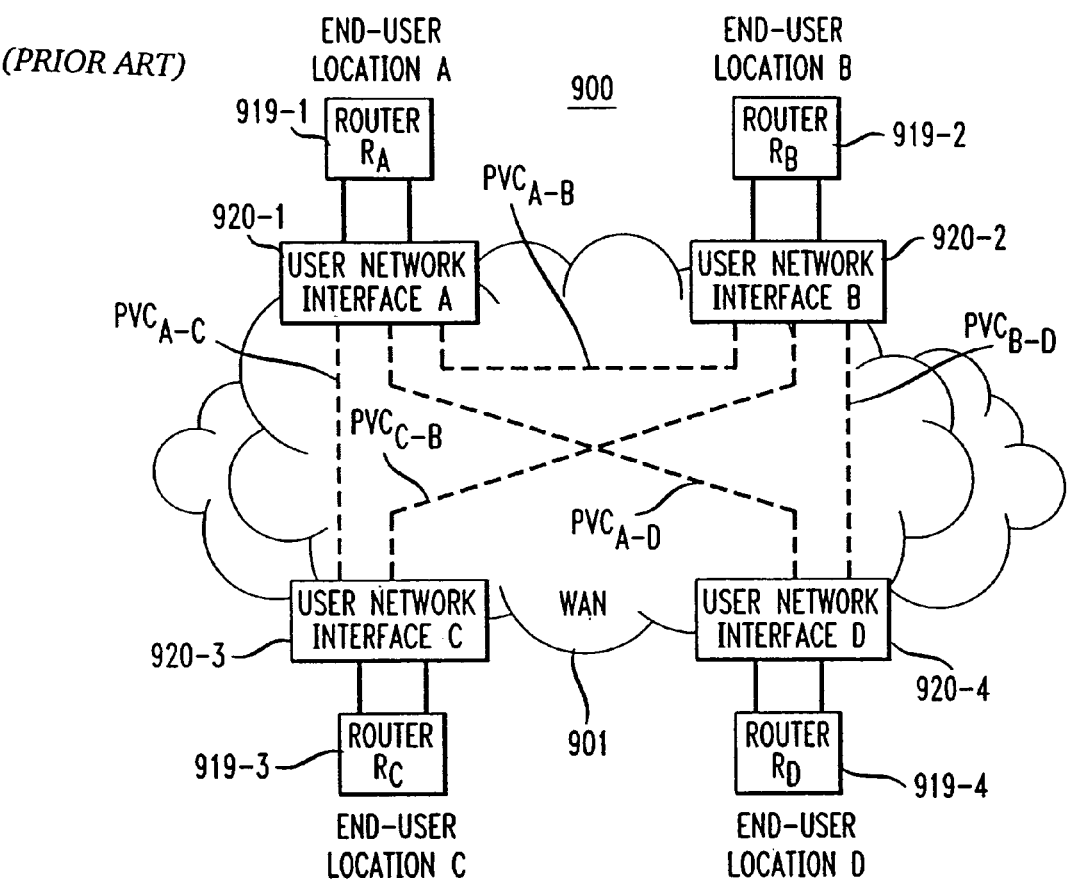
FIG. 1 illustrates a wide area network (WAN) having routers as CPEs and PVCs between customer locations.
Figure 2:
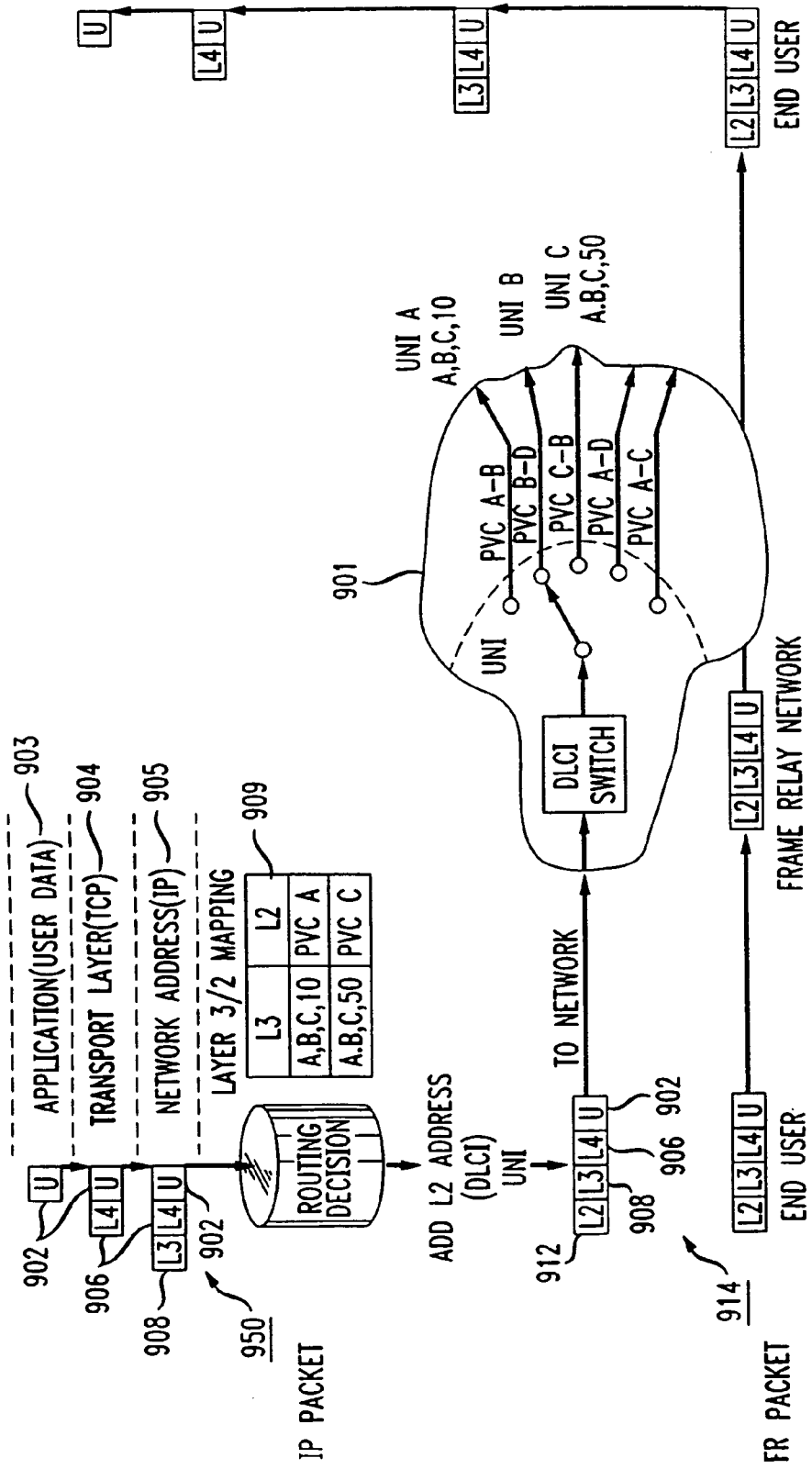
FIG. 2 shows data flow through the WAN shown in FIG. 1.
Figure 6:
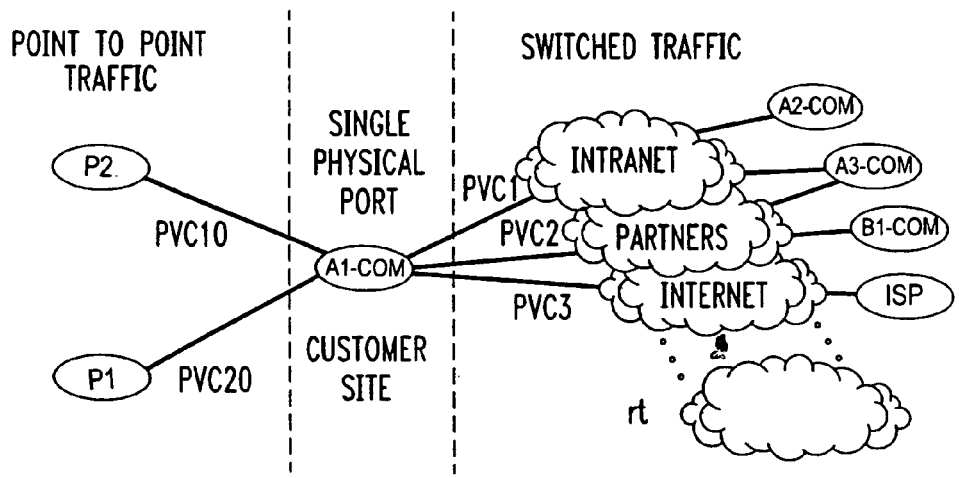
FIG. 6 shows a block diagram of a network architecture in accordance with aspects of the present invention.
Figure 11:
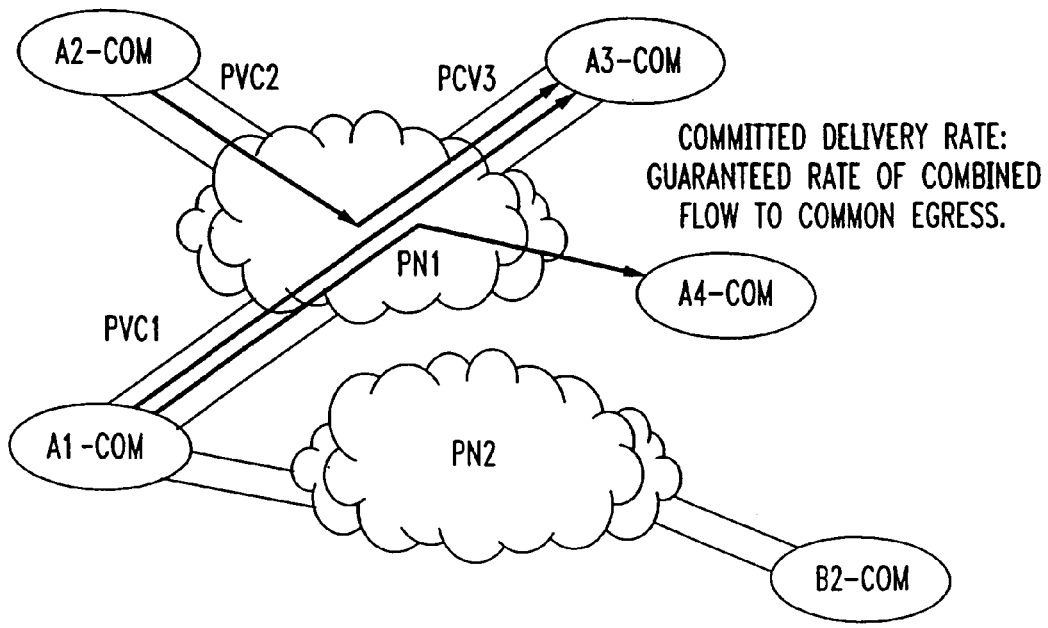
FIG. 11 illustrates an exemplary embodiment of a means to apportion services through the network of FIG. 6.
Figure 7:
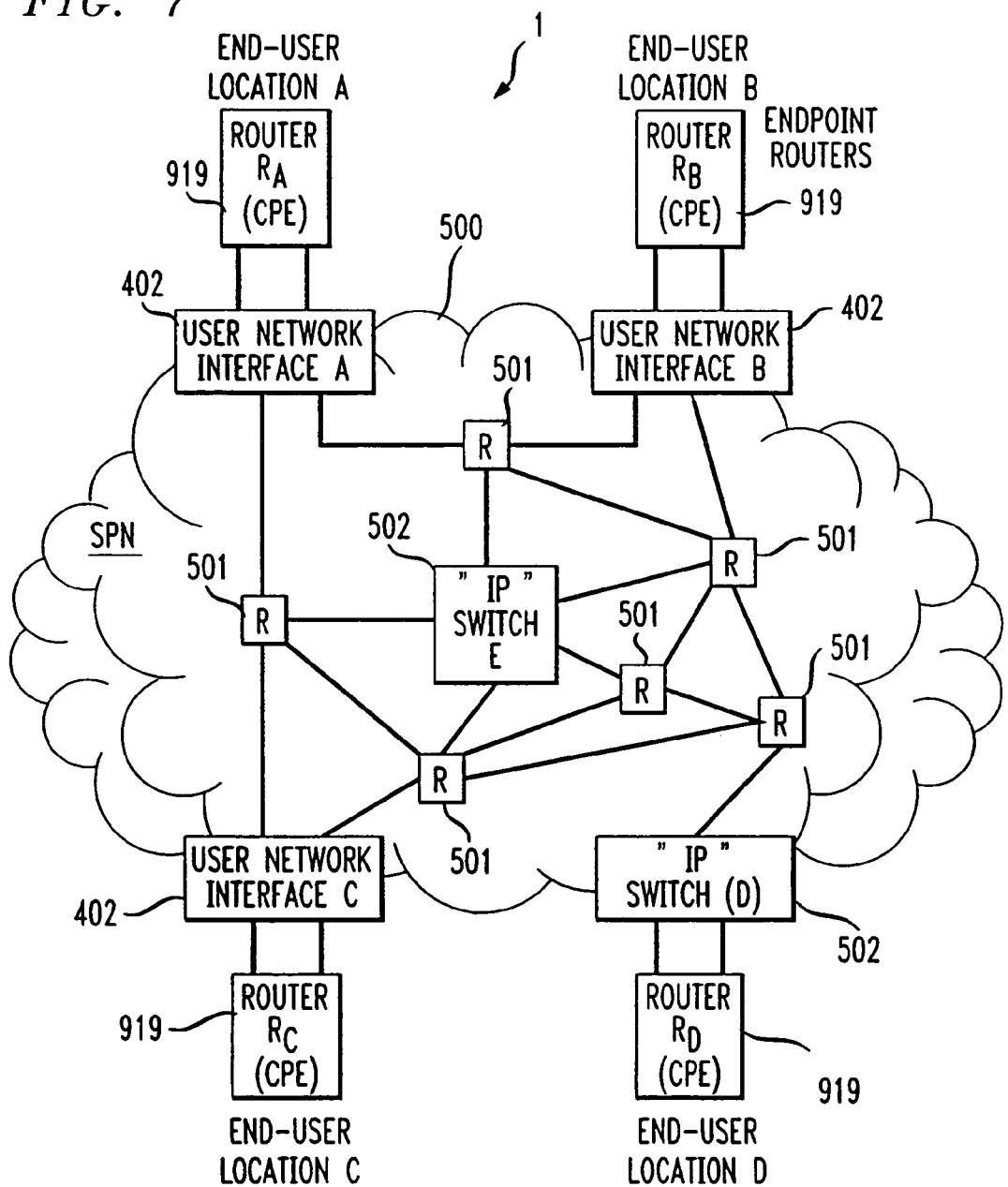
FIG. 7 shows a detailed block diagram of the network illustrated in FIG. 6.

Referring to FIG. 7, a block diagram of a wide area network (WAN) 1 incorporating aspects of the present invention is shown. The WAN 1 includes a plurality of customer premises equipment (CPE), for example routers located at each of the end user locations and interconnected via one or more service provider's networks (SPNs) 500. The SPN 500 is typically connected to a plurality of endpoint routers 919 via a plurality of corresponding user network interfaces (UNIs) 402 and/or one or more internet protocol (IP) switches 502. The IP switches 502, UNIs 402, and/or routers/switches 501 may be interconnected so as to form a meshed network (e.g., a partial or fully meshed network). Additionally, the wide area network (WAN) 1 may contain any number of IP switches 502 located within the WAN 1 such that it is not connected directly to any endpoint routers 919, and/or one or more IP switches 502 may be located at an interface between the SPN 500 and an endpoint router 919. In further embodiments of the invention, there may be multiple endpoint routers 919 associated with a UNI 402/IP switch 502 and/or multiple UNIs 402/IP switches 502 associated with an endpoint router 919.

Figure 8A:
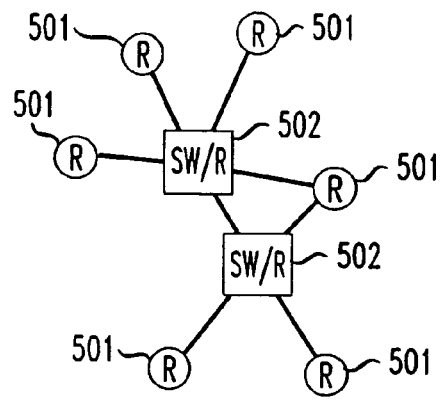
FIG. 8A-8B shows a migration path for incorporating aspects of the invention into conventional network architectures.
Figure 8B:
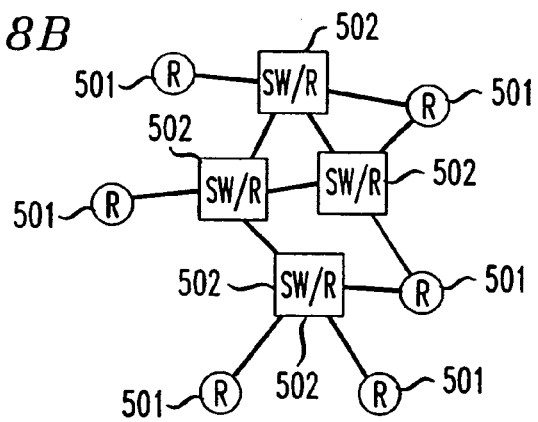
Figure 10:
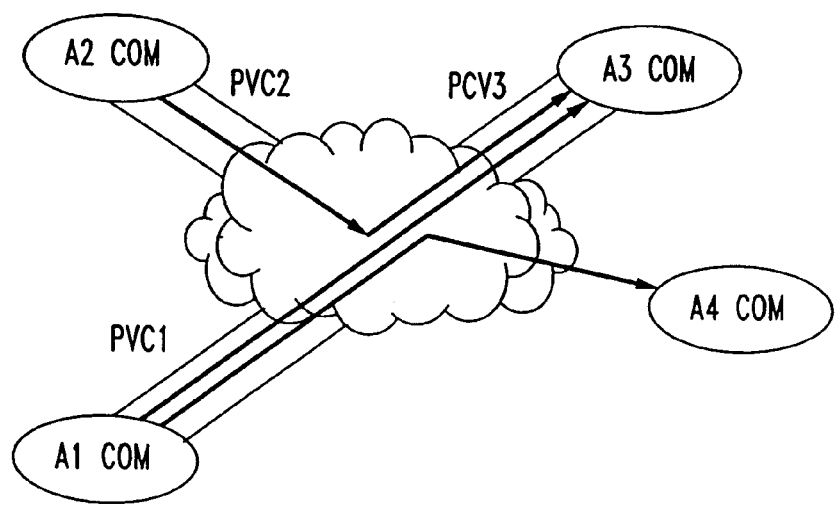
FIG. 10 shows application based prioritization through the network architecture of FIG. 6.

The network architecture of the WAN 1 allows the number of IP switches to increase as customers are transitioned to the new service. For example, as shown in FIG. 8A, initially there may be only a small number (e.g., one, two, three, etc.) of IP switches installed in the system. Where only a small number of IP switches are included in the network, traffic originating from non-IP enabled UNIs 402 (e.g., UNI A) may be routed to an IP switch 502 elsewhere in the network. Although this creates some negligible inefficiencies in "backtracking" it nonetheless allows a migration path to the new network architecture without simultaneously replacing all routers 501. However, as more and more users are transitioned to the new network architecture of WAN 1, more and more IP switches can be added (FIG. 8B) to accommodate the increased load. In many embodiments, it may be desirable to eventually convert each UNI 402 to an IP switch 502 such that IP routing may be accomplished at the edge of the network.

In some embodiments, the WAN 1 may include a combination of conventional network switches and/or routers 501 in addition to IP switches 502. On the other hand, every switch in the SPN 500 may be an IP switch 502. Alternatively, the WAN 1 may contain only a single IP switch 502. The IP switches 502 may be variously configured to include a suitable multi-layer routing switch such as a Tag Switch from Cisco. Multi layer routing switches may also be utilized from vendors such as Ipshon, Toshiba, IBM, and/or Telecom. IP switches are currently being developed to replace endpoint routers so that customer premises equipment (e.g., Ethernet local area network (LAN) equipment) can connect directly to an asynchronous transfer mode (ATM) network. Aspects of the present invention propose using IP switches in a different manner to maintain the huge installed base of customer premises equipment while avoiding the limitations of previous systems. Accordingly, the IP switches in accordance with embodiments of the invention are disposed within the SPN 500 and modified to provide suitable routing and interface functions.

In some embodiments of the invention, an IP switch 502 acts as a multi-layer switch. For example, an IP switch 502 may receive ATM cells, switching some or all of the ATM cells based upon the content of IP packets encapsulated within the ATM cells. Thus, IP addressing may be used by an IP switch 502 to determine an ATM virtual path for sending ATM cells to a destination UNI 402. In further embodiments of the invention, higher layer addressing (e.g., transmission control program (TCP) logical ports at layer 4) may also be used by an IP switch 502 as a basis for switching ATM cells to provide a path through the SPN 500. In still further embodiments of the invention, an IP switch 502 uses IP addresses and/or TCP logical ports to make quality of service (QOS) decisions.

In further embodiments of the invention, an endpoint router 919 may encapsulate one or more IP packets in frame relay frames 914. In this event, the frame relay frames may be transmitted between an endpoint router 919 and a corresponding UNI 402 and/or IP switch 502. The endpoint router 919 encapsulates IP packets 950 with frame relay frames 914. Further, the endpoint router 919 may set the DLCI of each frame relay frame 914 according to a particular service category (if a service category DLCI is used) that the user has selected. For example, the various service categories may include the public internet, communication via a local intranet, communication within a closed user group (CUG), communication with an extranet (e.g., a network of trusted suppliers or corporate trading partners), live audio/video transmission, multicasting, telephony over internet protocol (IP), or any combination thereof. Thus, the concept of a frame relay PVC is significantly expanded by aspects of the present invention. For example, the location of an intended network endpoint recipient is not necessarily determined by a DLCI at the endpoint routers 919.

In further embodiments of the invention, a UNI 402 may receive frame relay frames 914 from an endpoint router 919 and divides and encapsulates frame relay frames into, for example, smaller fixed-length ATM cells. The UNI 402 may further translate the frame relay DLCI into an ATM address (e.g., a virtual path identifier/virtual channel identifier (VPI/VCI)). There are various methods which may be used to translate DLCIs to VPI/VCIs. For example, the Network Interworking Standard as defined in Implementation Agreement #5 of the Frame Relay Forum, and/or the Service Interworking Standard as defined in Implementation Agreement #8 of the Frame Relay Forum may be utilized. An ATM address associated with a service category DLCI defines an ATM virtual path via network routers to an IP switch 502. Thus, ATM data associated with a service category DLCI is ultimately sent to an IP switch 502. However, ATM data associated with a conventional DLCI may or may not be sent to an IP switch 502 and may be routed through the network without passing through an IP switch 502. Thus, both translated IP data and conventional PVC data may be present in the SPN 500 and/or WAN 1.

In further embodiments of the invention, a UNI 402 and/or a network router 501 may send data to a predetermined IP switch 502. In even further embodiments of the invention, a UNI 402 and/or a network router 501 selects which IP switch 502 to send data to based upon an algorithm (e.g., based on network traffic flows, the relative distance/location of an IP switch 502, the type of data being sent, and/or the service category selected). In still further embodiments of the invention, a UNI 402, network router 501, and/or IP switch 502 may send the same data to more than one UNI 402, network router 501, and/or IP switch 502, depending upon, for example, a service category or categories.

In further embodiments of the invention, a UNI 402, an IP switch 502, and/or a network router 501 compares an ATM VPI/VCI 303-305 address with an IP address for the same data. If the two addresses are inconsistent, then the ATM cell may be discarded, sent to a pre-determined address, and/or returned to the sending location. In even further embodiments of the invention, layers above the layer 3 IP layer may be used for address and/or service class generation/discrimination. For example layer 4 of the ISO addressing scheme and/or other application level data may be utilized to determine particular service classes.

Figure 9:
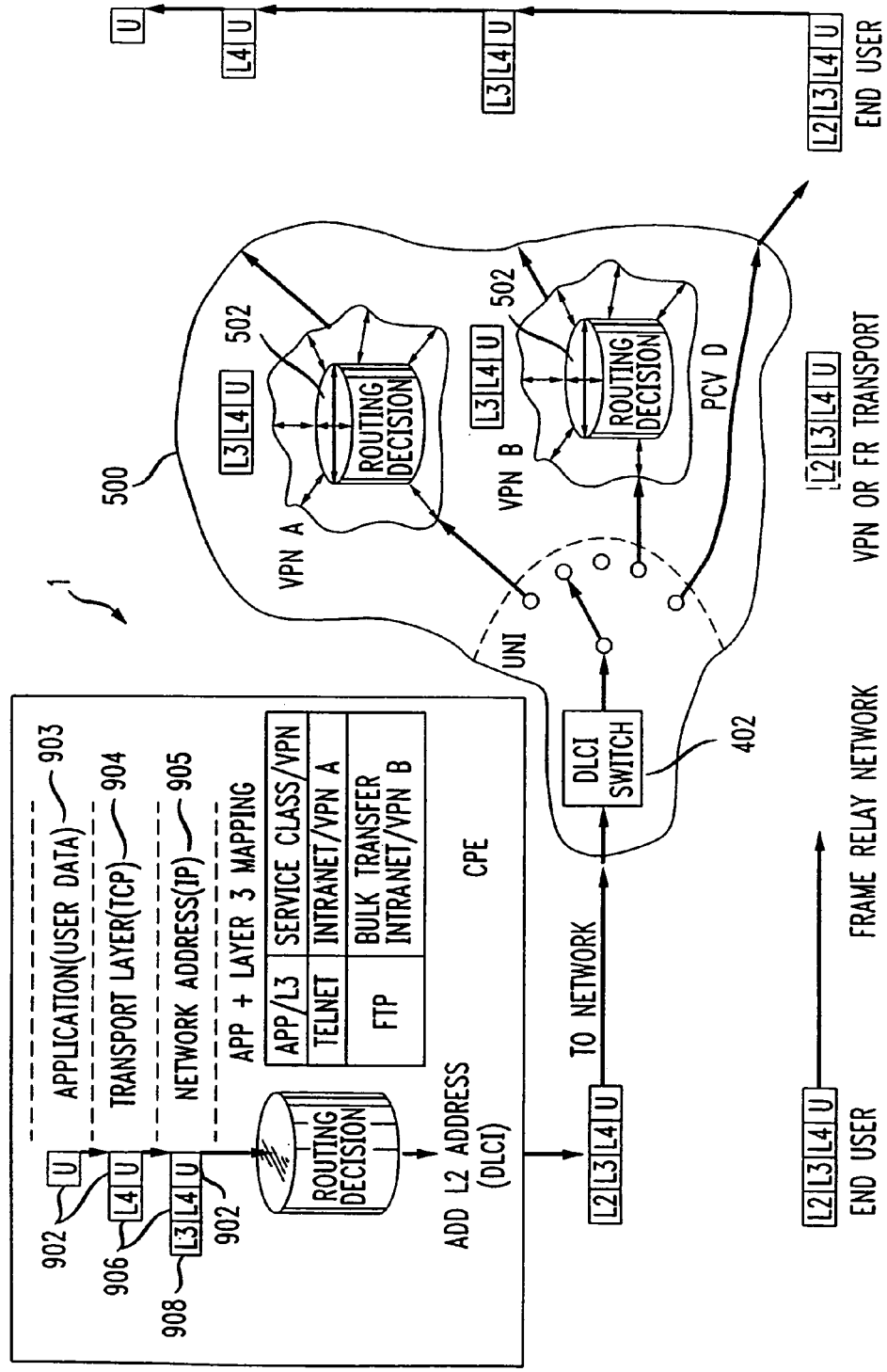
FIG. 9 shows data flow through the network architecture of FIG. 6.

Referring specifically to FIG. 9, the path of user data flowing through an exemplary WAN 1 is shown. As in the frame relay case, user data at the application layer and layer 4 requires the addition of a layer 3 network address header. In the CPE a decision is made based on information in layers 3 and 4 about which virtual private network (VPN), service class, or conventional PVC the packet should be routed to. Thus, a packet with layer 4 information indicating it is a telnet (interactive) application and layer 3 information that it is an internal company address might go to VPN A for a low-delay intranet class of service. Another packet that is part of a file transfer protocol (FTP) file transfer might go to VPN B with a lower service class, and a third packet going between two heavily utilized applications might go on a dedicated PVC D. These decisions are coded as different DLCI values, inserted in the layer 2 frame, and sent into the UNI.

At the UNI 402, the switching based on the DLCI takes place. The packet may be routed to IP switch 502 in the center of the SPN 500. The first packet has its layer 2 frame stripped off as it is forwarded to VPN A. Within VPN A, the layer 3 address is now used to make routing decisions that send the packet to its destination UNI. Thus, no PVC need be established ahead of time for that path, and conventional routing methods and protocols can be used, as well as newer "short-cut" routing techniques. This permits VPN A to provide a high "mesh" of connectivity between sites without requiring the customer to configure and maintain the "mesh" as a large number of PVCs. The packet forwarded to VPN B is treated similarly except that VPN B is implemented with a lower service class (e.g. higher delay). Finally, the packet forwarded to PVC D has its layer 2 frame intact and passes through the network as a conventional frame relay frame. This allows customers to maintain their current connectivity of PVCs for their high utilization traffic paths, but still have a high mesh of connectivity through various VPNs.

Thus, in various aspects of the invention, the WAN 1 and/or SPN 500 may be any suitable fast packet network receiving frame relay data packets having user data in a user data field. The WAN 1 and/or SPN 500 then switches packets using one or more IP switches 502 responsive to the user data. The user data may be used to discriminate between a plurality of different service categories based on the user data. Routing over the WAN 1 and/or SPN 500 may be responsive to at least one of the different service categories including discriminating based on multicast data. Additionally, the WAN may generate a fast packet address field responsive to the IP packet data and route the IP packet through the fast packet network responsive to the fast packet address field. Further, layer 4 information may be utilized to determine the quality of service. The quality of service may include, for example, one or more of the following: an information rate, priority information, delay, loss, availability, etc. Security features may be implemented in the IP switch such that routing tables for each of the users are separated based on one or more service categories and/or users. In this manner the system is made more secure. Still further, the system may receive a plurality of frame relay packets over a permanent virtual circuit (PVC) at a first node in an asynchronous transfer mode (ATM) network, generate an ATM address based on a data field other than a data link connection identifier (DLCI) within the frame relay packets, and then route the packets through the ATM network based on the ATM address. The routing of packets may be responsive to one of a plurality of service categories. The system may provide separate routing tables within an ATM switch for each of a plurality of different service categories. The different service categories may be determined using internet protocol (IP) data within a data field of a packet passed by the ATM switch. In a fast packet network, a fast packet switch may compare an address of a fast packet with a layer 3 internet protocol (IP) address contained within the fast packet and determining whether the fast packet address is consistent with the layer 3 IP address. Further, for security, hardware circuits and/or software may be provided for examination of a sending address or a destination address. Further, packets may be discarded responsive to an inconsistency being detected. The WAN 1 may include customer premises equipment (CPE) and an asynchronous transfer mode (ATM) switch coupled to and receiving from the CPE frame relay data packets, and including address translation circuitry for translating data link connection identifiers from the frame relay data packets into ATM addresses representing a plurality of virtual private networks based on a predetermined service category associated with a particular DLCI; or the WAN 1 may include customer premises equipment (CPE) and a fast packet switch coupled to the CPE via one or more permanent virtual circuits and receiving frame relay data packets, the fast packet switch including address translation circuitry for translating user data within the frame relay data packets into fast packet addresses.

In embodiments of the present invention, data security is enhanced in that data may be easily and accurately checked for inconsistencies at the destination. This is because these embodiments operate using both layer 2 and layer 3 addressing information. As an illustration, assume that a frame relay frame having a DLCI indicating VPN 1 (e.g., the corporate intranet) arrives in a network switch/router with an IP address of a particular corporate accounting system. However, since the VPN processor has available to it the DLCI of the packet (and thus information about the source of the packet), the VPN processor may cross-check the DLCI with the source IP address in the packet to see if the source IP address is in the range known from the originating site. Thus, the problem associated with the spoofing of IP source addresses may be significantly reduced.

In still further embodiments of the invention, a UNI 402, an IP switch 502, and/or a network router 501 has separate and/or partitioned routing look-up tables. Routing tables may be separated based upon service category, customer or user, and/or UNI 402. Thus, in some embodiments, within a VPN, a customer or user may have an individual routing table containing the customer's IP network address information. In some embodiments, since the DLCI identifies the source of a frame, the DLCI may be used as an index by an IP switch, network router, and/or UNI for determining which routing table to use. This allows customers to have their routing table size and speed governed by their individual address space, thus speeding the routing process considerably. The use of separate routing tables also provides an added measure of security, as packets cannot be mis-routed due to errors or updates in routing information related to other customers.

In some embodiments, a router has multiple data space images paired with a single instruction space image of the routing software. Thus, for example, as packets arrive from Customer A, the routing software uses the data image for a routing table associated with Customer A to make a routing decision. In further embodiments, a single software image is used, but additional indices corresponding to customers are added to the routing tables. In still further embodiments, instruction execution and data handling are processed separately. This may be accomplished by the use of separate processors, one for instruction execution and one for data handling.

Figure 12:
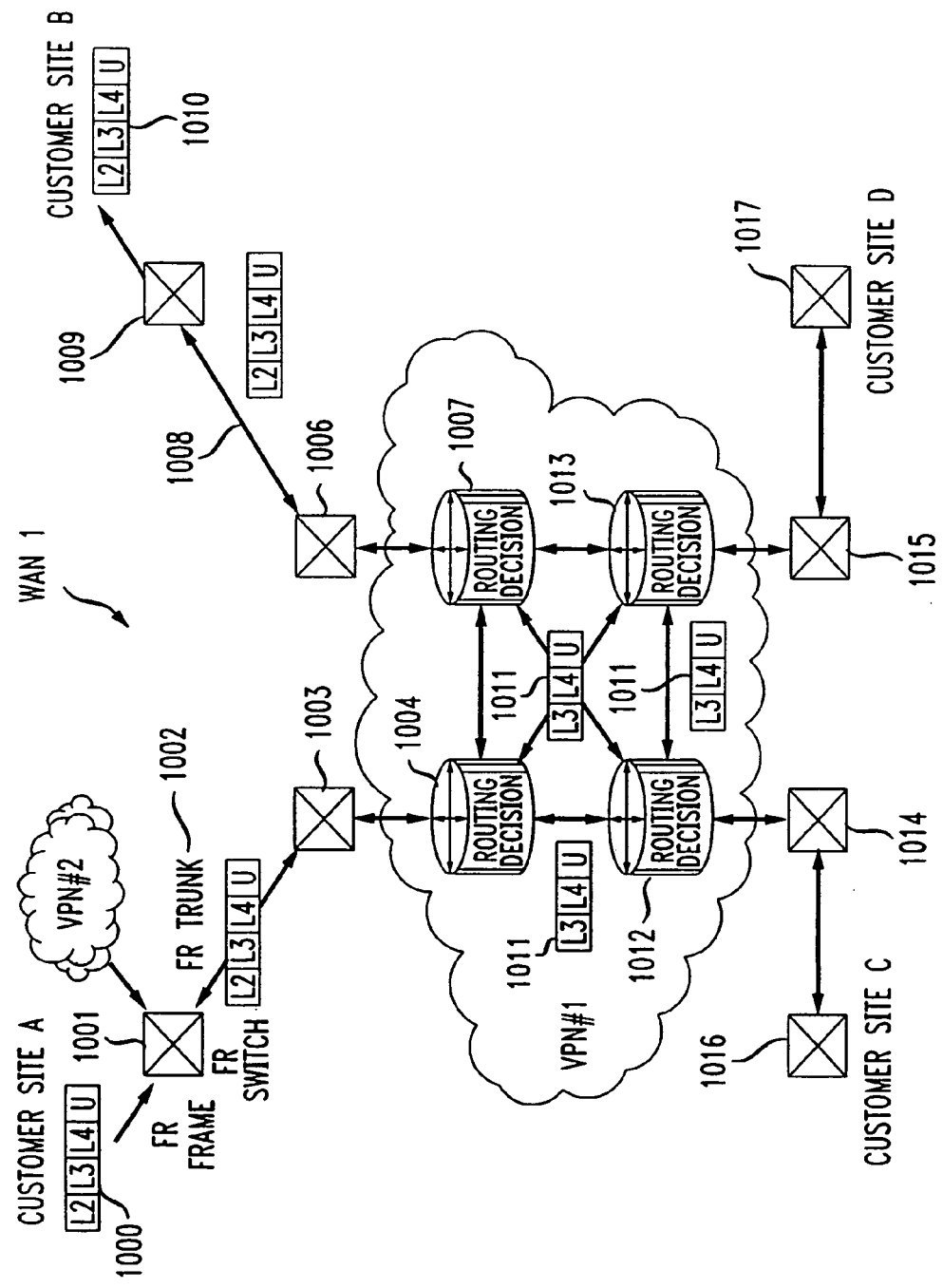
FIGS. 12-14 illustrate data flow through exemplary WANs 1.

FIG. 12 illustrates an exemplary WAN 1 having both conventional routers and IP switches incorporating aspects of the invention. In this exemplary WAN 1, a routing element 1004 and switch 1003 are connected to Customer Site A via frame relay switch 1001. Routing element 1007 and switch 1006 are connected to Customer Site B via frame relay switch 1009. Routing element 1012 and switch 1014 are connected to Customer Site C via frame relay switch 1016. Routing element 1013 and switch 1015 are connected to Customer Site D via frame relay switch 1017. In this exemplary WAN 1, incoming frames 1000 from Customer Site A may be encoded with a layer 2 DLCI specifying VPN #1 as the layer 2 destination and a layer 3 address pointing to Customer Site B. In such a case, frame relay switch 1001 switches the frames over a frame relay trunk 1002 to switch 1003 which has layer 3 routing element 1004 associated with it. After the frame is received by switch 1003, the frame is forwarded to router 1004 which implements short-cut routing as described above. The router/switch 1003, 1004 uses the layer 2 information to discriminate between different source customers. The layer 2 information may then be discarded. Next, the layer 3 information in combination with a routing table is used to make a routing decision. In this case, the routing decision would result in a layer 3 PDU 1011 being forwarded to router/switch 1006, 1007. The layer 3 PDU 1011 is then encapsulated with a layer 2 frame, the frame in this case being addressed to Customer Site B. Switch 1006 then forwards the frame via a trunk 1008 to frame relay switch 1009. At the egress port of frame relay switch 1009, the DLCI of frame relay frame 1010 is replaced with a value indicating that the frame originated from, in this case, VPN #1. The frame relay frame 1010 is then delivered to the Customer B router.

Figure 13:
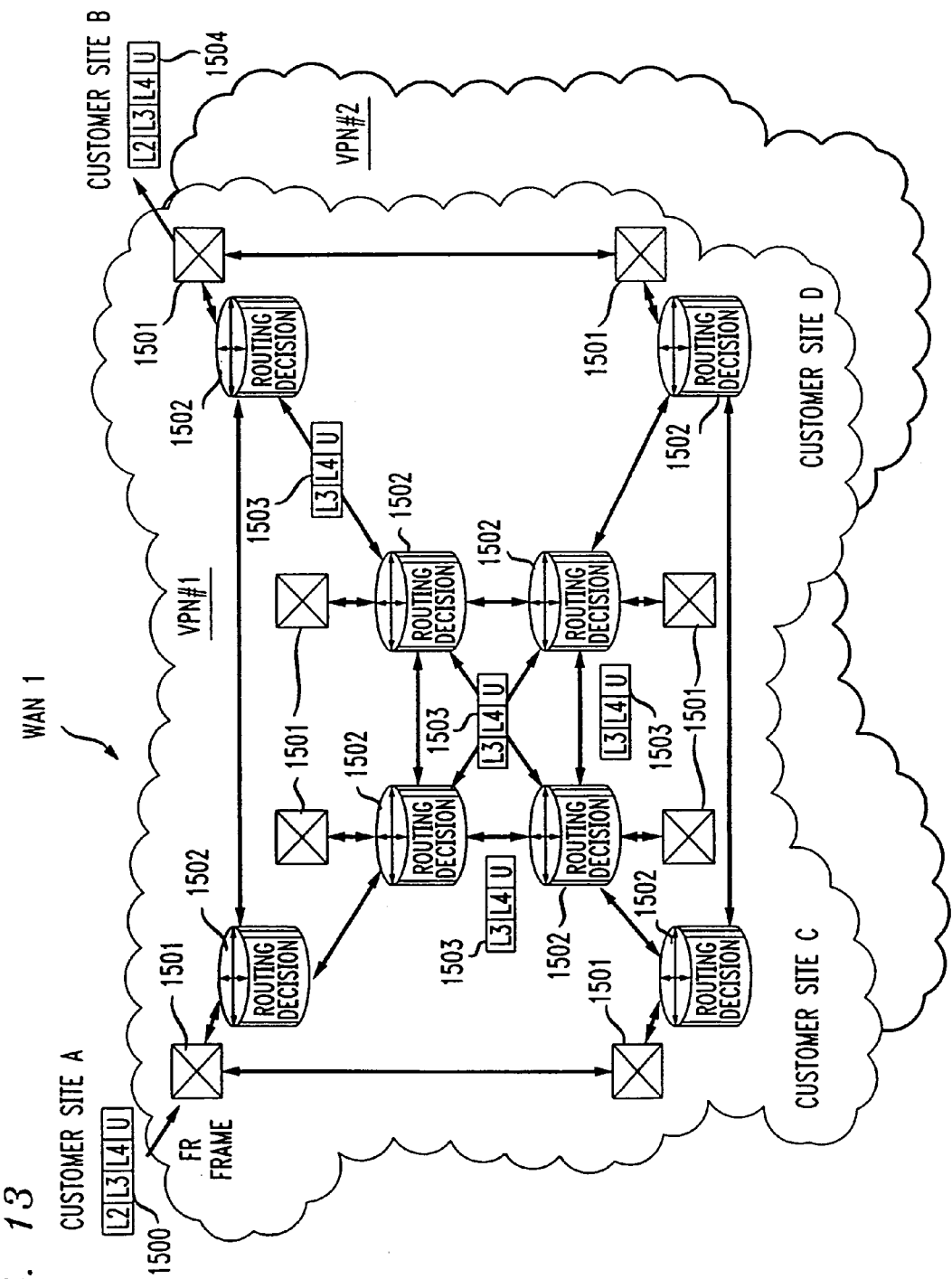

As the service grows, the functionality for making the VPN routing decisions may be migrated closer to the customer and may eventually be present in every switching node, as shown in FIG. 13. This can reduce the backhaul previously needed to get to the router/switch processing nodes and allow for optimal routing using all the nodes in the WAN 1 and/or SPN 500. In the exemplary embodiment of FIG. 13, VPN #1 is connected to Customer Sites A, B, C, and D. Here, every switching node includes a switch 1501 and a routing element 1502. frame relay frames 1500 having a DLCI directed to Customer Site B may be sent from Customer Site A. In such a case, frames 1503 would be sent through VPN #1 via switching nodes 1501, 1502, and frames 1504 would be received at Customer Site B.

Figure 14:
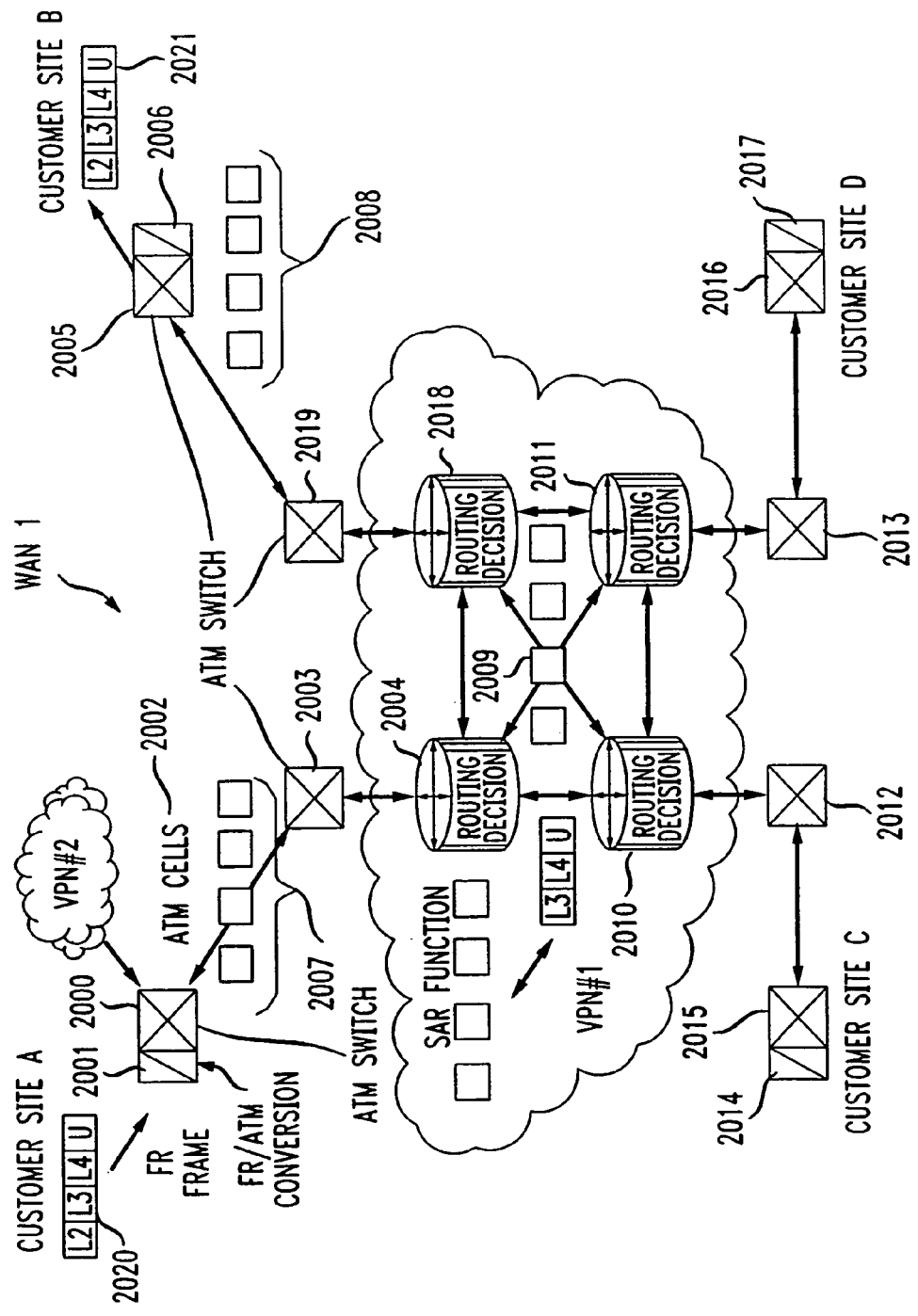

In some embodiments, an ATM core network may be used for data transport, and frame relay interfaces may be used to interface with the customer. An exemplary embodiment using an ATM core network is shown in FIG. 14. In this embodiment, switch 2003 and router 2004 are connected to Customer Site A via switch 2000 and a frame relay/ATM conversion unit 2001. Switch 2019 and router 2018 are connected to Customer Site B via switch 2005 and frame relay/ATM conversion unit 2006. Switch 2012 and router 2010 are connected to Customer Site C via switch 2015 and frame relay/ATM conversion unit 2014. Switch 2013 and router 2011 are connected to Customer Site D via switch 2016 and frame relay/ATM conversion unit 2017 Assuming that Customer Site A is sending frames 2020 destined for Customer Site B, incoming layer 2 frames may be encapsulated for transport into ATM cells at switch 2000 according to, for example, the Network Interworking Standard. Such encapsulation may, for example, occur in conversion unit 2001, external to ATM switch 2000. ATM cells 2002 may be sent down an ATM PVC designated for VPN #1 processing. ATM cells 2002 may then be forwarded to switch 2003 and router/switch 2004 (which may be attached to switch 2003), where the ATM cells may be reassembled to obtain the layer 3 packet information for routing within VPN #1. Once the address information has been extracted from the layer 3 packet, the packet may be segmented again into ATM cells 2009 that can be transferred through the network. After being sent through router/switch 2018, 2019, ATM cells 2008 may be converted from cells to frames at the external conversion unit 2006 and switch 2005. Customer Site B would then receive frame relay frames 2021. Thus, an extra segmentation and reassembly (SAR) cycle may be required when using an ATM backbone with a core of router/switches. However, if the VPN processing is pushed outward to edge switches, the extra SAR cycle may be eliminated. The extra SAR cycle may be eliminated because conversion from frame relay frames to ATM cells may take place in the same unit where VPN routing decisions are made.

Traffic management may be variously configured in the WAN 1 and/or the SPN 500. For example, from a customer's viewpoint, the WAN 1 and/or SPN 500 may ensure certain traffic rates for the customer.

In a network, data traffic may be sent from multiple sources to a single destination (multi-point to point). A "source" is defined as the user transmitting side of, for example, a UNI i.e., the customer side of a UNI, which may be external to a WAN and/or to a VPN), a switch, an IP switch, and/or a router at or near the edge of a network. A "destination" is defined as the user receiving side of, for example, a UNI (i.e., the network side of a UNI), a switch, an IP switch, and/or router at or near the edge of a network. Traffic that is offered for transmission by a source to the WAN 1 and/or SPN 500 is defined as the "offered traffic." Further, a "VPN source" and a "VPN destination" are a source and destination, respectively, which belong to a given VPN. A given UNI, if simultaneously sending and receiving, may simultaneously be a source and a destination. Furthermore, a given source may offer data traffic to multiple destinations, and a given destination may receive traffic from multiple sources.

In some embodiments of the invention, a committed delivery rate (CDR) may be assigned to each destination. The CDR is defined as the average number of bits per second that the WAN 1 and/or SPN 500 is committed to deliver to a given destination, wherein the average may be calculated over a fixed or variable time window. Although the word "average" will be used throughout, any other similar algorithm may be used, such as the mean, the sum, or any other useful measurement and/or statistical calculation. If the average rate of aggregate offered traffic (i.e. the total offered traffic) from one or more sources to a given destination is greater than or equal to a given destination's assigned CDR, then the WAN 1 and/or SPN 500 may guarantee to deliver traffic addressed to the destination at an average rate equal to or greater than the CDR. If the average rate of aggregate offered traffic is less than the CDR, then the WAN 1 and/or SPN 500 may deliver the offered traffic to the destination at the aggregate offered traffic rate (100% of the offered traffic). To clarify, let the number of active sources sending traffic to a particular destination be N. As will be described in more detail below, a source may be considered "active" during a given time window if the source offers at least a threshold amount of traffic to the WAN 1 and/or SPN 500 within the given time window. Let $S_i$ be the average offered traffic rate, or "offering rate," from each source i toward a single given destination, wherein i=[1, ..., N]. Further, let R be the total rate at which the WAN 1 and/or SPN 500 actually delivers traffic to the destination. Then, the WAN 1 and/or SPN 500 will provide that:

$$R \geq CDR \quad \text{if} \quad \sum_i S_i \geq CDR;$$

$$R = \sum_i S_i \quad \text{otherwise.}$$

If the aggregate offered traffic rate $\Sigma S_i$ does not exceed the CDR, then 100% of the offered traffic from each source i may be delivered through the WAN 1 and/or SPN 500 to the destination. However, when the aggregate offered traffic rate $\Sigma S_i$ exceeds the CDR, the WAN 1 and/or SPN 500 may have the discretion to throttle back or reduce the delivery rate of offered traffic from some or all of the active sources. Delivery may be reduced by an amount such that the total rate of traffic delivery R to a destination is at least equal to the destination's assigned CDR. In the situation where R is reduced by the network, it may be desirable to enforce "fairness" for each source. In other words, it may be desirable to ensure that no single source may be allowed to be greedy by obtaining a disproportionate amount of network bandwidth at the expense of other sources.

To provide for fair access to the WAN 1 and/or SPN 500, in some embodiments each source is assigned at least one destination rate share (DRS). A DRS is a rate, measured in data units per unit of time (e.g., bits per second). A separate DRS and/or set of DRSs may be assigned to each source and/or group of sources. Further, the DRS or DRSs for a given source may depend upon the destination or set of destinations that the source may send traffic to. In other words, each source i may be assigned at least one $DRS_i$ corresponding to the DRS assigned between a source i and a given destination (or set of destinations). Thus, in some embodiments, the DRS may be different for a given source depending upon which destination it is sending traffic to. In further embodiments, the DRS for a given source may be constant, independent of the destination.

When a source i offers traffic at an average rate $S_i$ exceeding the CDR of a particular destination, fairness may be achieved by ensuring that each source is allowed to transmit at least its fair share of the CDR. A source's "fair share" of the destination's CDR is defined as the source's DRS divided by the aggregate DRS of active sources transmitting to a given destination. Thus, each active source's fair share, $r_i$, of the CDR may be defined as the following:

$$r_i = \frac{DRS_i}{\sum_i DRS_i} CDR.$$

The actual network transmission rate, $T_i$, that the WAN 1 and/or SPN 500 chooses as conforming traffic guaranteed to be delivered from each source to a given destination may satisfy the following:

$$\text{when} \sum_i S_i \geq CDR,$$

$$T_i \geq \min(r_i, S_i).$$

Thus, in these embodiments the WAN 1 and/or SPN 500 may enforce fairness by reducing one or more sources' actual network transmission rate $T_i$ at most from $S_i$ to $r_i$ ensuring that each source obtains its fair share of the CDR. In some embodiments, to achieve a rate of at least CDR, the WAN 1 and/or SPN 500 may at its discretion transmit traffic from a given active source or sources at a rate greater than $r_i$. In fact, the WAN 1 and/or SPN 500 may at its discretion transmit data from a source i at any rate between and including the fair share rate $r_i$ and the full offered rate $S_i$.

If $S_i$ is greater than $T_i$, a source may be considered by the WAN 1 and/or SPN 500 to be a "non-conforming source." Conformance of a source may be calculated using a standard leaky bucket algorithm with variable drain rate. Thus, the conforming "depth" of a "bucket" would be $DRS_i*W$. In other words, the maximum number of bits that will be sent to the network within a given time window of length W is equal to $DRS_i*W$. During a given time window of length W, the "drain rate" of the "bucket" is equal to $T_i$ which is calculated during previous time windows. Thus, data packets inserted "above" the conforming bucket depth may be labeled as "nonconforming." In other words, for a given time window, data packets in excess of the total $DRS_i*W$ number of bits may be labeled as non-conforming data packets. In such a situation, some or all of the source data packets equal to the difference between $S_i$ and $T_i$ may be labeled as non-conforming data packets, and some or all of the non-conforming data packets may be dropped.

This does not mean that data cannot be of a bursty or rate-variant nature. Although exemplary embodiments have been described as operating using average rates, real-time rates may vary within any given time window of length W. Thus, a certain amount of burstiness of data is allowable. This maximum burst size is the maximum number of bits that the WAN 1 and/or SPN 500 guarantees to transfer during a time window W.

In further embodiments of the invention, the WAN 1 and/or SPN 500 may provide forward congestion notification to a destination. For example, the WAN 1 and/or SPN 500 may provide a layer 2 binary indication that the CDR is being exceeded by using the frame relay forward explicit congestion notification (FECN) bit and/or a layer 3 message that indicates a non-conforming source and optionally contains rate information for that source (e.g. the actual transmitted rate $T_i$ and/or the excess rate $S_i-T_i$). Furthermore, in some embodiments, multiple non-conforming sources might be listed, even within a single message. In these forward congestion notification embodiments, conformance may be measured at the network side of a destination. In some embodiments, a forward congestion notification may be provided to a given destination when the offering rate $S_i$ of an active source offering to send traffic to the destination exceeds the actual network transmission rate $T_i$ for the source.

Non-conforming packets that cannot be transmitted on the egress port of a source may be dropped with or without any indication to the source or destination. To measure conformance of a source, the amount of excess bandwidth available to the sources for transmission to the destination should be determined. To calculate the excess bandwidth, let $W_j$ be the $j^{th}$ time window. The excess bandwidth above the fair share bandwidth may be computed as $$E = CDR - \sum_i \min(r_i, S_i) - MB,$$

wherein M is defined as the number of possible sources from which a destination may receive traffic, and wherein B is defined as a predetermined reference rate. The introduction of reference rate B effectively reserves network bandwidth for an inactive source, thus ensuring that a previously inactive source that becomes active can send at least some traffic through the network during time period $W_j$. Specifically, the WAN 1 and/or SPN 500 may ensure that each source's $T_i$ is guaranteed to be at least a minimum reference rate B. In this situation, a source is considered active during $W_j$ if more than $B*W_j$ units of data (e.g., bits) are received during $W_j$. It is desirable to define B to be relatively small as compared with $S_i$ so as to retain as much excess bandwidth as possible, yet still large enough to ensure network availability to a non-active source (non-sending source with respect to a given destination) that may later become active with respect to a given destination. In some embodiments, B may be a predetermined rate. In further embodiments, B may vary with time, with the number of inactive sources, with the number of active sources, and/or with the total number of sources. In still further embodiments, B for a source may depend upon a priority classification assigned to the source. In still further embodiments, when a previously inactive source becomes active, the priority assigned to the source may depend upon the content of the data (e.g., data payload, DLCI, and/or address) offered to be sent. Thus, B may not be the same for each source.

Once the excess bandwidth is determined, the maximum conforming actual network transmission rates, $T_i$, may be calculated. To accomplish this, $T_i$ for each source may first be set by default to $\min(r_i, S_i)$. Then the excess bandwidth, E, may be distributed among some or all of the sources that are actively transmitting to the given destination, thus adjusting or raising $T_i$ for these sources. In some embodiments, the excess bandwidth may be uniformly distributed among some or all of the active sources. In further embodiments, the excess bandwidth may be distributed among these sources according to source priority, data priority, and/or DLCI.

In further embodiments, the WAN 1 and/or SPN 500 may provide backward congestion notification to a non-conforming source. Such notification may be in the form of a layer 2 and/or a layer 3 message indicating a destination(s) for which the non-conforming source is exceeding $T_i$ and/or rate information for the non-conforming source (e.g. the actual transmitted rate $T_i$ and/or the excess rate $S_i-T_i$). However, a layer 2 notification by itself may not be preferable, since a source receiving only a layer 2 notification may not be able to distinguish between destinations to which the source is conforming and those for which it is not conforming. In some embodiments, a backward congestion notification may be provided to a given active source when the offering rate $S_i$ of the source exceeds the actual network transmission rate $T_i$ for the source. In further embodiments, a user at a non-conforming source may be notified of congestion information, the assigned CDR, $DRS_i$, $r_i$, and/or $T_i$. In still further embodiments, it may be up to a user to decide how to act upon a congestion notification. In even further embodiments, a source may reduce its offering rate $S_i$ in response to receiving a backward congestion notification.

In these backward congestion notification embodiments, conformance may be implemented at the network side of the source UNI. In such embodiments, feedback concerning the destination delivery rate may be required from the destination. The feedback may also contain information regarding the rate share of the active sources at the destination and/or the CDR divided by the aggregate rate.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Additionally, although a meshed network is shown in the examples, the inventions defined by the appended claims is not necessarily so limited. Further, the IP switch may convert from any higher level IP like protocol to any fast-packet like protocol and is not necessarily limited to the ATM/IP example provided above. Furthermore, examples of steps that may be performed in the implementation of various aspects of the invention are described in conjunction with the example of a physical embodiment as illustrated in FIG. 5. However, steps in implementing the method of the invention are not limited thereto. Additionally, although the examples have been derived using the IP protocol for layer three, it will be apparent to those skilled in the art that any version of IP or IPX could be used as the layer three routeable protocol. Furthermore, it will be understood that while some examples of implementations are discussed above regarding IP and ATM protocols, the invention is not intended to be limited solely thereto, and other protocols that are compatible with aspects of the invention may be used as well.

We claim:

1. A method comprising the steps of:
   receiving into a fast packet network frame relay data packets, said frame relay data packets having user data in a user data field, wherein said user data comprises service category data, wherein the service category data describes a communication type comprising at least two of: communication via the public internet, communication via a local intranet, communication via a closed user group (CUG), communication via an extranet, communication via a live audio/video transmission, communication via multicasting, or communication via telephony over internet protocol (IP);
   switching said frame relay packets within the fast packet network responsive to the user data;
   discriminating between a plurality of service categories based on the user data; and
   routing over a virtual private network responsive to at least one of the service categories.

2. The method of claim 1 further including the step of routing over the virtual private network, the virtual private network comprising trading partners responsive to at least one of the service categories.

3. The method of claim 1 further including the step of routing over a closed user group responsive to at least one of the service categories.

4. The method of claim 1 wherein the step of discriminating includes recognizing multicast data.

5. The method of claim 1 wherein the step of discriminating includes recognizing voice data.

6. The method of claim 1 wherein the step of discriminating includes recognizing video data.

7. The method of claim 1 wherein the user data includes an Internet protocol IP packet.

8. The method of claim 1 wherein the fast packet network is an asynchronous transfer mode network and the packets are asynchronous transfer mode cells.

9. A method comprising the steps of:
   receiving a plurality of frame relay packets over a permanent virtual circuit at a first node in an asynchronous transfer mode network;
   generating an asynchronous transfer mode address based on a data field other than a data link connection identifier within the frame relay packets; and
   routing the packets through the asynchronous transfer mode network based on the asynchronous transfer mode address;
   wherein the step of routing includes routing the packets responsive to one of a plurality of service categories, wherein the service category data describes a communication type comprising at least two of: communication via the public internet, communication via a local intranet, communication via a closed user group (CUG), communication via an extranet, communication via a live audio/video transmission, communication via multicasting, or communication via telephony over internet protocol (IP).

10. A network comprising:
    customer premises equipment;
    an asynchronous transfer mode switch coupled to and receiving from the customer premises equipment a plurality of frame relay data packets, the asynchronous transfer mode switch including address translation circuitry for translating data in a user data field from at least one of the frame relay data packets into an asynchronous transfer mode address, the asynchronous transfer mode address representing at least one of a plurality of virtual private networks and depending on a predetermined service category associated with a particular data link connection identifier, wherein the service category describes a communication type comprising at least two of: communication via the public internet, communication via a local intranet, communication via a closed user group (CUG), communication via an extranet, communication via a live audio/video transmission, communication via multicasting, or communication via telephony over internet protocol (IP).

11. The network of claim 10, wherein a first data link connection identifier from a first frame relay data packet is translated into a first asynchronous transfer mode address, and a second data link connection identifier from a second frame relay data packet is translated into a second asynchronous transfer mode address.

12. A method of routing a data packet, comprising the steps of:
    receiving the data packet in a network, said data packet having header information and user data information, wherein said user data information comprises IP packet data;
    selecting a service category responsive to said header information, wherein the service category describes a communication type comprising at least two of:
    communication via the public internet, communication via a local intranet, communication via a closed user group (CUG), communication via an extranet, communication via a live audio/video transmission, communication via multicasting, or communication via telephony over internet protocol (IP);
    transmitting the data packet responsive to the selected service category;
    switching said data packet within the network responsive to the user data information, wherein the step of switching includes discriminating between service categories responsive to the user data information.

13. The method of claim 12, wherein the data packet is a frame relay data packet.

14. A method comprising the steps of:
   receiving data packets into a fast packet network, said data packets comprising header data in a header data field and user data in a user data field, wherein said header data comprises a service category indicator, wherein said user data comprises a destination address, wherein the service category indicator describes a communication type comprising at least one of: communication via the public internet, communication via a local intranet, communication via a closed user group (CUG), communication via an extranet, communication via a live audio/video transmission, communication via multicasting, or communication via telephony over internet protocol (IP); and
   switching said data packets within the fast packet network responsive to the header data and the user data, each service category indicator corresponding to a plurality of destinations.

15. The method of claim 14 further including the step of routing responsive to the user data.

16. The method of claim 14 further including the step of routing within a virtual private network responsive to the user data.

17. The method of claim 14 further including the step of routing within a virtual private network, the virtual private network comprising trading partners, responsive to the user data.

18. The method of claim 14 further including the step of routing within a closed user group responsive to the user data.

19. The method of claim 14 further including the step of discriminating between a plurality of service categories based on the header data so that packets with a first service category indicator receive a first Quality of Service (QoS) and packets with a second service category indicator receive a second QoS.

20. The method of claim 15 wherein the user data comprises multicast data.

21. The method of claim 15 wherein the user data comprises voice data.

22. The method of claim 15, wherein the user data comprises video data.

23. The method of claim 15, wherein the user data comprises an IP address.

24. The method of claim 14, wherein the data packets are frame relay data packets.

25. The method of claim 14, wherein the data packets are asynchronous transfer mode data packets.

* * * * *